(12) United States Patent
Hikosaka

(10) Patent No.: US 9,417,402 B2
(45) Date of Patent: Aug. 16, 2016

(54) DUST CAP AND CONNECTOR ENGAGEMENT BODY

(71) Applicant: YAZAKI CORPORATION, Minato-ku, Tokyo (JP)

(72) Inventor: Tomohiro Hikosaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/740,416

(22) Filed: Jun. 16, 2015

(65) Prior Publication Data

US 2015/0277063 A1   Oct. 1, 2015

Related U.S. Application Data

(63) Continuation of application No. PCT/JP2013/083947, filed on Dec. 18, 2013.

(30) Foreign Application Priority Data

Dec. 19, 2012   (JP) .................................. 2012-276620

(51) Int. Cl.
*G02B 6/00* (2006.01)
*G02B 6/38* (2006.01)
*H01R 13/52* (2006.01)
*G02B 6/42* (2006.01)

(52) U.S. Cl.
CPC .............. *G02B 6/3849* (2013.01); *G02B 6/428* (2013.01); *G02B 6/4292* (2013.01); *H01R 13/5213* (2013.01)

(58) Field of Classification Search
CPC .. G02B 6/3897; G02B 6/3849; G02B 6/3825; G02B 6/3887; G02B 6/3893; G02B 6/00

USPC .................................. 385/134, 136, 137, 139
See application file for complete search history.

(56) References Cited

U.S. PATENT DOCUMENTS

| 5,596,663 A | 1/1997 | Ishibashi et al. | |
|---|---|---|---|
| 6,280,102 B1 * | 8/2001 | Go | G02B 6/421 385/94 |
| 2002/0013076 A1 | 1/2002 | Akeda et al. | |

FOREIGN PATENT DOCUMENTS

| JP | H04-063495 A | 2/1992 |
|---|---|---|
| JP | H04-063496 A | 2/1992 |
| JP | H07-297418 A | 11/1995 |
| JP | H11-307817 A | 11/1999 |
| JP | 2000-147328 A | 5/2000 |
| JP | 2002-023009 A | 1/2002 |
| JP | 2012-230319 A | 11/2012 |
| JP | 2012-238413 A | 12/2012 |
| WO | 2011/013289 A1 | 2/2011 |
| WO | 2012/002385 A1 | 1/2012 |
| WO | 2012/002386 A1 | 1/2012 |

* cited by examiner

*Primary Examiner* — Jennifer Doan
(74) *Attorney, Agent, or Firm* — Mots Law, PLLC

(57) ABSTRACT

A connector engagement body (1) comprises: a housing (3) from which a lead frame (9) of an electronic component (7) projects; and a heat-resistant dust cap (5) resistant to the heat generated when soldering the lead frame (9) and disposed in the housing (3) to prevent foreign substances from entering the inside of the housing (3), the center of gravity of the housing (3) and the electronic component (7) is located closer to the lead frame (9) than to a support (11) for the housing (3).

20 Claims, 6 Drawing Sheets

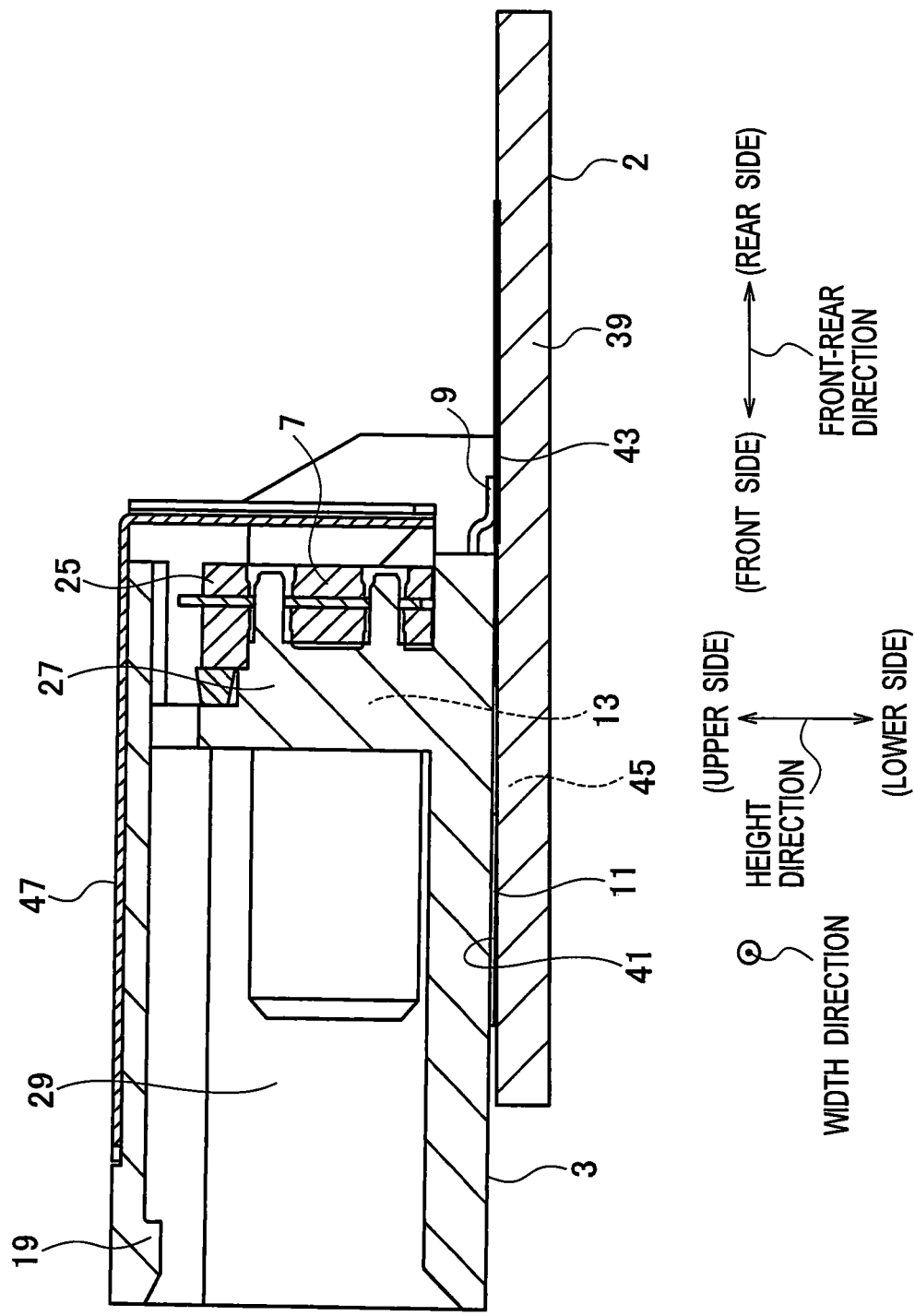

DUST CAP AND CONNECTOR ENGAGEMENT BODY

CROSS REFERENCE TO RELATED APPLICATIONS

This application is a Continuation of PCT Application No. PCT/JP2013/083947, filed on Dec. 18, 2013, and claims the priority of Japanese Patent Application No. 2012-276620, filed on Dec. 19, 2012, the content of both of which is incorporated herein by reference.

BACKGROUND

1. Field of the Invention

The present invention relates to a dust cap and connector engagement body, e.g., to a dust cap and a connector engagement body used for an optical connector.

2. Related Art

Conventionally, an optical module 201 as shown in FIG. 1 is known (refer to Japanese Unexamined Patent Application Publication No. 2000-147328).

The optical module 201 includes an optical connector 203 and a heat-resist protection cap (dust cap) 205. The optical connector 203 includes a package 207, a metal lead 209 and a synthetic resin ferrule 211. The lead 209 and the ferrule 211 project from the package 207.

SUMMARY OF THE INVENTION

In the optical module 201, when the lead 209 is soldered to a circuit (not shown) of a printed board in a state where the protection cap 205 is placed and the optical module 201 is mounted on a surface of the printed board, since a gravity center exists on the side of the dust cap 205, moment in a direction in which the lead 209 separates from the printed board generates in the optical module 201. Hence, there is a problem that the optical module 201 cannot be mounted on the surface of the printed board in a stable manner.

The present invention has been accomplished in view of the above problem, and it is an object of the invention to provide a dust cap and a connector engagement body capable of stably placing a connector engagement body on a printed board even in a state where the dust cap is placed in a housing.

With regard to the first aspect of the present invention, a dust cap placed in a housing for preventing foreign substance from entering an inner portion of the housing, in which a lead frame of an electronic component projects from the housing, wherein the dust cap has heat resistance against heat generated when the lead frame is soldered, and a gravity center including the housing and the electronic component is located closer to the lead frame than a support portion of the housing in a state where the dust cap is placed in the housing is provided.

With regard to the second aspect of the present invention, the dust cap according to claim 1, wherein the housing is formed into a cylindrical shape, the electronic component is provided in the inner portion of the housing on one end portion of the housing in an extending direction of the housing, the lead frame projects downward of the housing at one end portion of the housing in an extending direction of the housing, the support portion projects downward of the housing at an intermediate portion of the housing in an extending direction of the housing, the dust cap includes a cylindrical dust cap body portion and a closing portion which closes an opening portion in one end of the dust cap body portion in an extending direction of the dust cap body portion, the dust cap is formed into a box shape, the housing is provided with a locking portion, the dust cap is provided with a locked portion and a releasing operation portion, in a state where the dust cap is placed in the housing, the closing portion is located on a side of the electronic component, the other end portion of the dust cap body portion in an extending direction of the dust cap body portion slightly projects from the other end portion of the housing in an extending direction of the housing, the locked portion is locked to the locking portion, the dust cap is placed in the housing inside the housing, the releasing operation portion projects from the housing, and in a state where the dust cap is placed in the housing, when the releasing operation portion is pressed down, a locked state between the locked portion of the dust cap and the locking portion of the housing is released, and the dust cap can be detached from the housing.

With regard to the third aspect of the present invention, a connector engagement body comprising: a housing from which a lead frame of a placed electronic component projects; and a dust cap which has a heat resistance against heat generated when the lead frame is soldered and which is placed in the housing for preventing foreign substance from entering an inner portion the housing, wherein in a state where the dust cap is placed in the housing, a gravity center including the housing and the electronic component is located closer to the lead frame than a support portion of the housing.

With regard to the fourth aspect of the present invention, the connector engagement body according to claim 3, wherein the housing is formed into a cylindrical shape, the electronic component is provided in the inner portion of the housing on one end portion of the housing in an extending direction of the housing, the lead frame projects downward of the housing at one end portion of the housing in an extending direction of the housing, the support portion projects downward of the housing at an intermediate portion of the housing in an extending direction of the housing, the dust cap includes a cylindrical dust cap body portion and a closing portion which closes an opening portion in one end of the dust cap body portion in an extending direction of the dust cap body portion, the dust cap is formed into a box shape, the housing is provided with a locking portion, the dust cap is provided with a locked portion and a releasing operation portion, in a state where the dust cap is placed in the housing, the closing portion is located on a side of the electronic component, the other end portion of the dust cap body portion in an extending direction of the dust cap body portion slightly projects from the other end portion of the housing in an extending direction of the housing, the locked portion is locked to the locking portion, the dust cap is integrally placed in the housing inside the housing, the releasing operation portion projects from the housing, and in a state where the dust cap is placed in the housing, when the releasing operation portion is pressed down, a locked state between the locked portion of the dust cap and the locking portion of the housing is released, and the dust cap can be detached from the housing.

According to the present invention, it is possible to stably place a connector engagement body on a printed board even in a state where a dust cap is placed in a housing.

BRIEF DESCRIPTION OF THE DRAWINGS

FIG. 7 is a cross-sectional view showing an outline configuration of the connector engagement body from which the dust cap is detached in a state where the connector engagement body according to the embodiment of the invention is placed on a printed board (circuit board) viewing a plane orthogonally intersecting with the width direction and including the central portion of the connector engagement body.

DESCRIPTION OF THE EMBODIMENTS

In this embodiment, for convenience sake of description, predetermined one direction is defined as a front-rear direction, predetermined one direction intersecting with the front-rear direction at right angles is defined as a width direction, and a direction intersecting with the front-rear direction and the width direction at right angle is defined as a height direction.

A connector engagement body (optical module) 1 according to the embodiment of the present invention converts an optical signal sent through optical fiber into an electric signal, and converts an electric signal into an optical signal which is sent through the optical fiber, for example. The connector engagement body 1 is placed on a printed-board (circuit board; rigid board) 2 as shown in FIG. 7 and is used.

Figure 1:
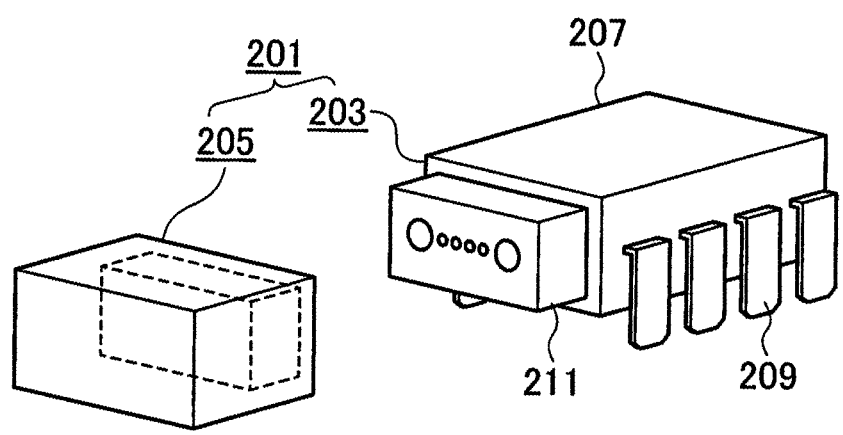
FIG. 1 is a perspective view showing a conventional connector engagement body.
Figure 2:
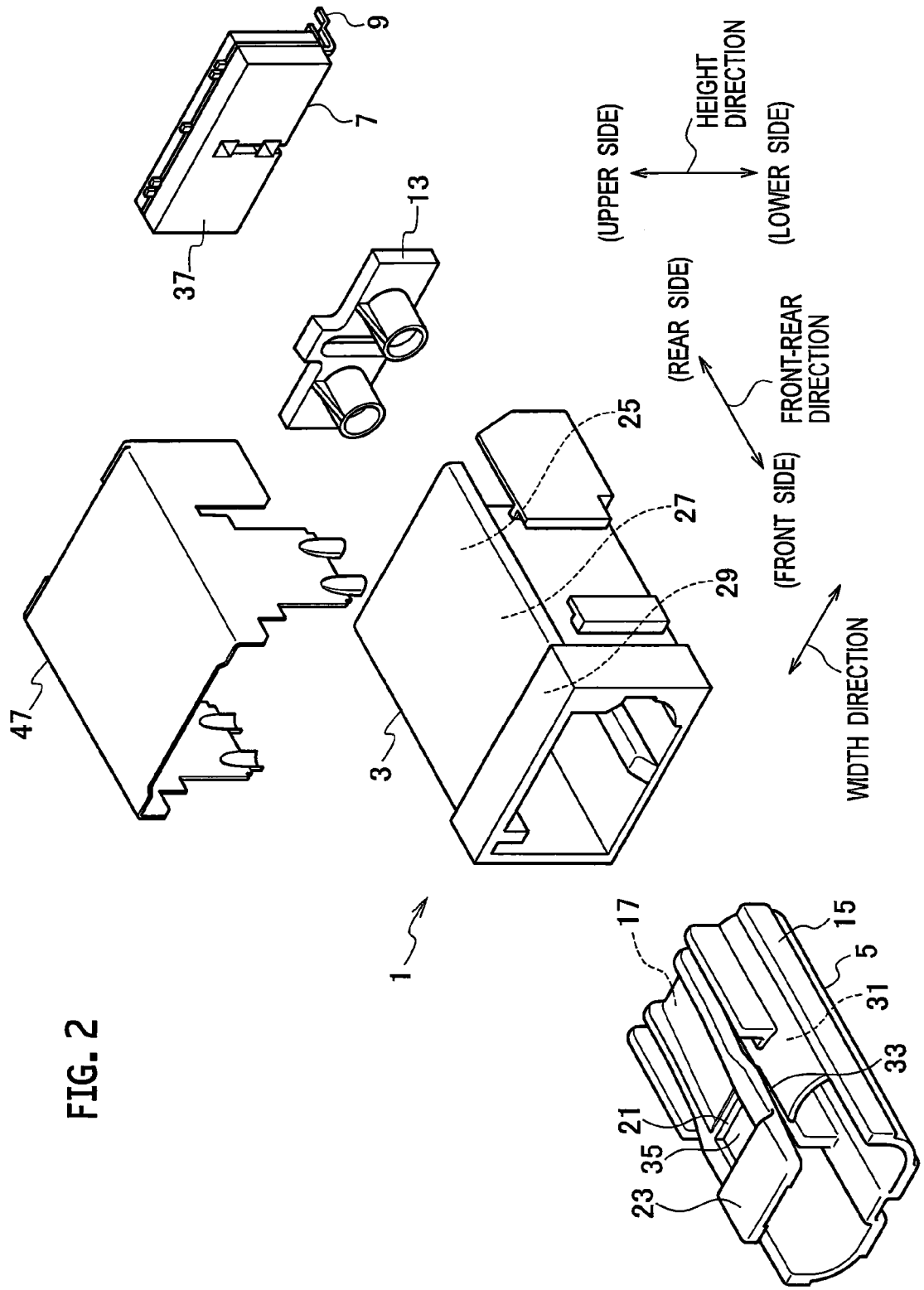
FIG. 2 is a perspective view showing an outline configuration of a connector engagement body according to an embodiment of the present invention viewing the connector engagement body from above.

As shown in FIG. 2, the connector engagement body 1 includes a housing 3 and a dust cap (protection cap) 5.

The housing 3 and the dust cap 5 are integrally formed from insulating material such as synthetic resin for example. An electronic component (such as Fiber Optic Transceiver; FOT) 7 is placed in the housing 3. In a state where the FOT 7 is placed in the housing 3, a lead frame (lead frame supporting reflow; outer lead) 9 (see FIG. 4) projects from the housing 3.

The dust cap 5 is placed in the housing 3 and is used for preventing foreign substance from entering the housing 3. The dust cap 5 has heat resistance against heat generated when the lead frame 9 is soldered to the printed board 2. This soldering is reflow soldering, and the lead frame 9 is soldered by soldering paste 43 which is previously applied to predetermined portions of the printed board body as shown in FIG. 7. The dust cap 5 is not softened or deformed by heat of reflow. Properties and characteristics of the dust cap 5 are not deformed either.

Figure 3:
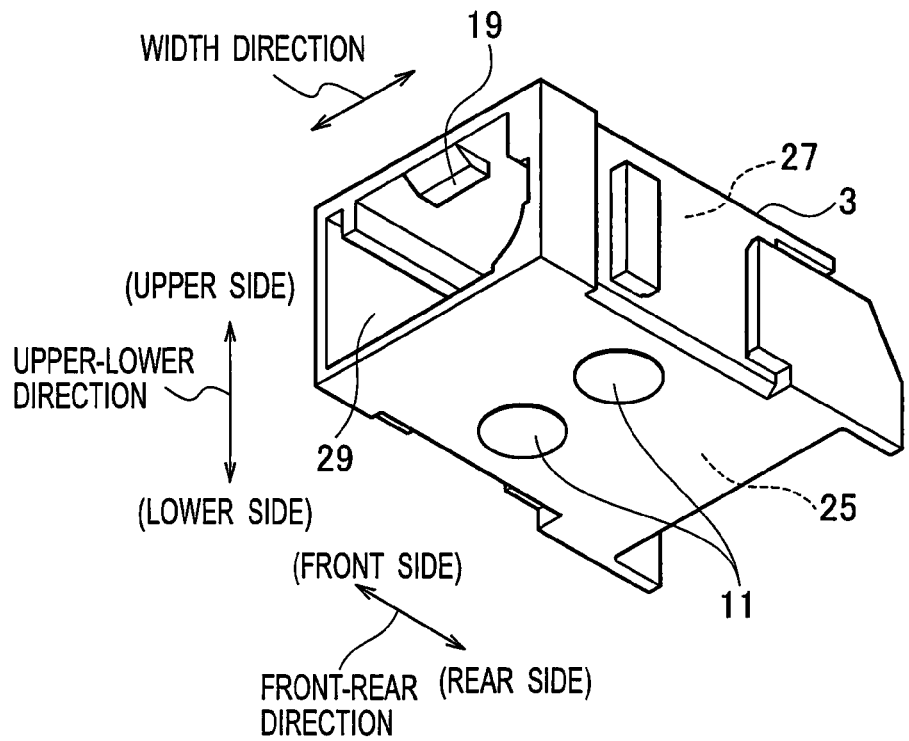
FIG. 3 is a perspective view showing the outline configuration of a housing of the connector engagement body according to the embodiment of the invention viewing the housing from above.
Figure 6:
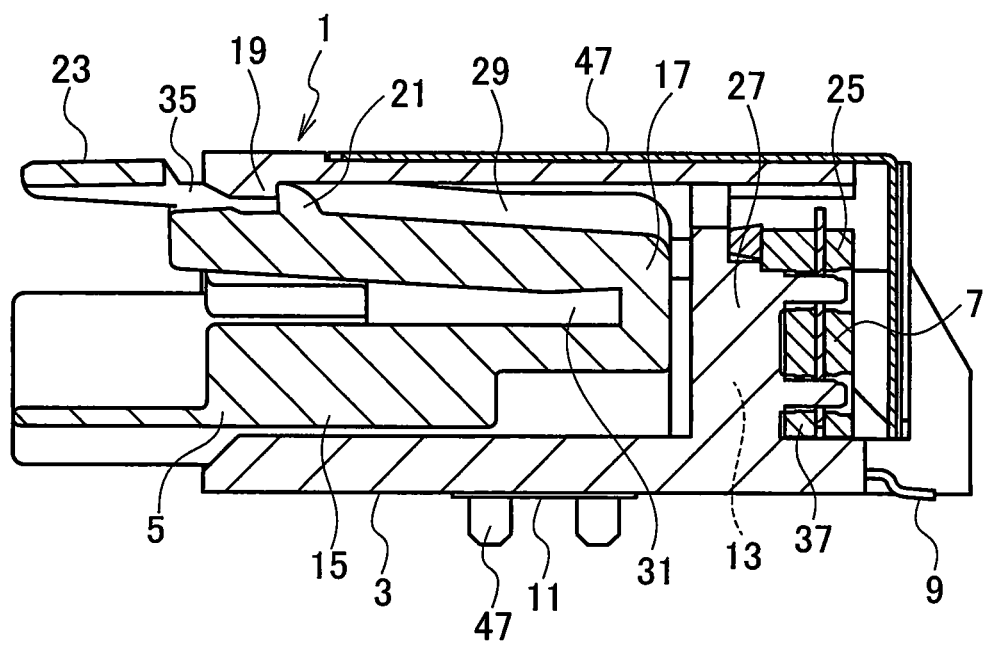
FIG. 6 is a cross-sectional view showing an outline configuration of the connector engagement body including the dust cap according to the embodiment of the invention viewing a plane orthogonally intersecting with the width direction and including a central portion of the connector engagement body.
Figure 6:
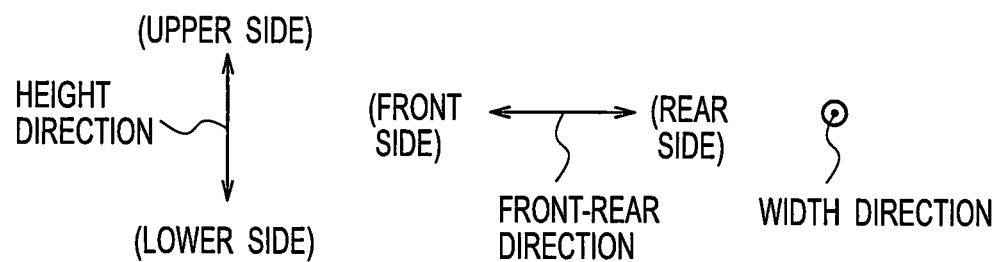

In a state where the dust cap 5 is placed in the housing 3 as shown in FIG. 6, a gravity center including such as the housing 3 and the FOT 7 is located closer to the lead frame 9 than support portions 11. As shown in FIG. 3, the support portions 11 are provided in the housing 3 so that the housing 3 is placed on the printed board 2.

The housing 3, the FOT 7, and the like also have heat resistances against heat generated when the lead frame 9 is soldered like the dust cap 5. The dust cap 5 can be attached to and detached from the housing 3.

The support portions 11 are provided at an intermediate portion of the housing 3 with respect to the front-rear direction of the housing 3. The support portions 11 project slightly toward a lower side from a lower end of the housing 3 with respect to the height direction of the housing 3. When the housing 3 from which the support portions 11 project toward the lower side is placed on the printed board 2, a tip end portion (lower end portion) of the support portions 11 engage with the printed board 2. In FIG. 6, the printed board 2 projects in the horizontal direction in a state where a thickness direction of the printed board 2 corresponds to the height direction of the housing 3.

The lead frame 9 projects from a rear portion of the housing 3 with respect to the front-rear direction of the housing 3. Like the support portions 11, the lead frame 9 projects slightly toward the lower side from the lower end of the housing 3 with respect to the height direction of the housing 3. When the housing 3 from which the lead frame 9 projects downward is placed on the printed board 2, a lower end of the lead frame 9 engages with the printed board 2, and the lead frame 9 is soldered to a circuit of the printed board 2. The lead frame 9 is soldered to the circuit of the printed board 2 through soldering paste 43 for example.

In a state where a placing operation of the housing 3 provided with the FOT 7 and the like on the printed board 2 is completed as shown in FIG. 7, the support portions 11 and the lead frame 9 engage with the printed board 2, and other portions of the housing 3 and the dust cap 5 placed on the housing 3 separated from the printed board 2 upward.

The housing 3 is placed on (soldered to) the printed board 2 in a state where electronic components (FOT 7, lens 13) or the like and the dust cap 5 are placed in the housing 3 (in a state where devices to be placed on the housing 3 are placed) and in a state where an optical connector (not shown) placed instead of the dust cap 5 and optical fiber (not shown) extending from the optical connector are not connected to the housing 3. When the housing 3 is soldered, a gravity center of a total mass of the housing 3, the electronic component 7 and the dust cap 5 is located rearward of the support portions 11. For example, the gravity center is located between the support portions 11 and the lead frame 9 with respect to the front-rear direction of the housing 3.

As shown in FIGS. 3 and 6, the housing 3 is formed into a rectangular cylindrical shape. The FOT 7 is provided in the housing 3 and on one end portion of the housing 3 in an extending direction thereof (front-rear direction). That is, the FOT 7 is provided on a rear end portion in the housing 3 in which a center axis extends in the front-rear direction and a front end and a rear end of the housing 3 open.

The lead frame 9 of the FOT 7 projects downward of the housing 3 on one end portion (rear end portion) of the housing 3 in an extending direction thereof. The support portions 11 project downward of the housing 3 at an intermediate portion of the housing 3 in an extending direction thereof.

Figure 5:
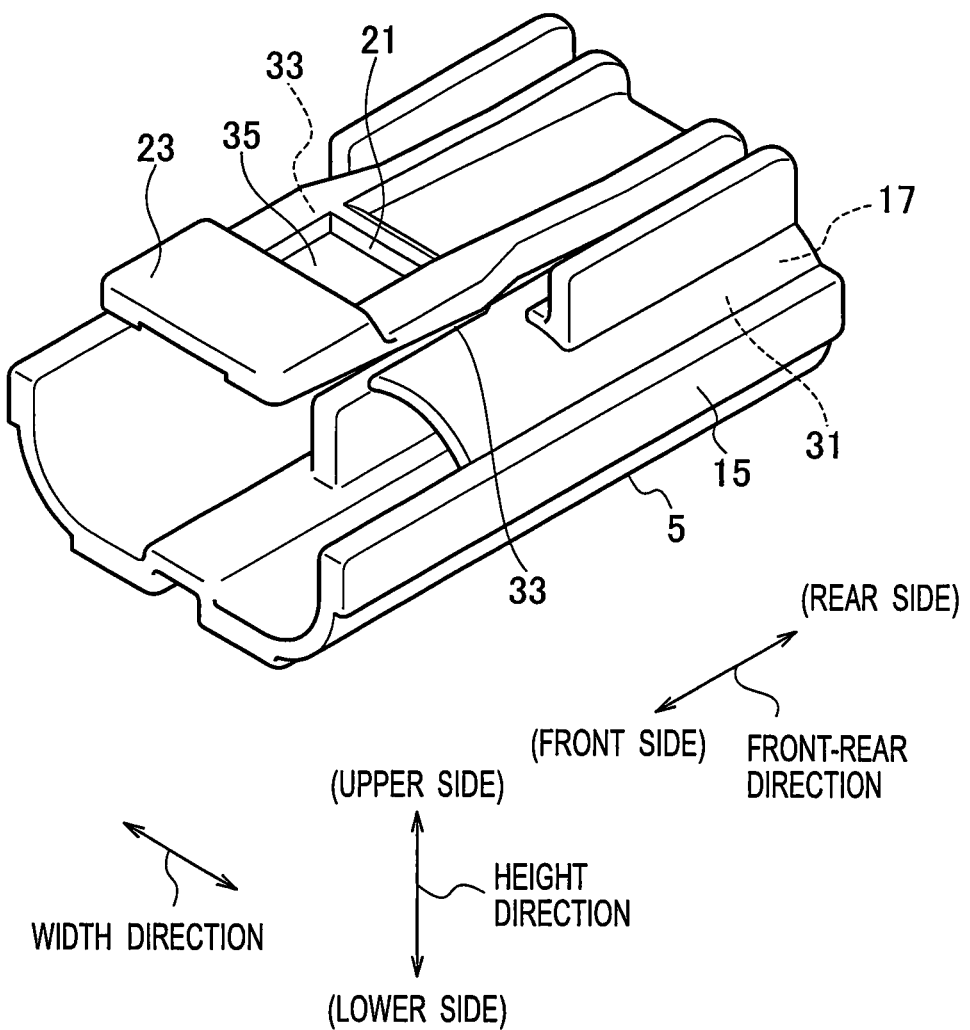
FIG. 5 is a perspective view showing an outline configuration of a dust cap the connector engagement body according to the embodiment of the invention viewing the dust cap from above.

As shown in FIG. 5, the dust cap 5 is formed into a box shape. The dust cap 5 includes a cylindrical dust cap body portion (sleeve cover portion) 15 and a plate-shaped closing portion 17 which closes an opening of one end (rear end) of the dust cap body portion 15 in an extending direction of the dust cap body portion 15.

As shown in FIG. 6, a locking portion 19 is provided on an inner upper portion and on the other end side (front side) of the housing 3 in an extending direction of the housing 3. As shown in FIG. 5, a locked portion 21 is provided on an outer upper portion of the dust cap body portion 15 of the dust cap 5 and on an intermediate portion of the dust cap body portion 15 in an extending direction of the dust cap body portion 15. A releasing operation portion 23 is provided on the outer upper portion of the dust cap body portion 15 of the dust cap 5 and on the other end portion (front end portion) of the dust cap body portion 15 in an extending direction of the dust cap body portion 15.

In a state where the dust cap 5 is placed in the housing 3, the closing portion 17 is located on the side of the FOT 7 (rear side), and the other end portion (front end portion) of the dust cap body portion 15 in an extending direction of the dust cap body portion 15 projects slightly forward from the other end (front end) of the housing 3 in an extending direction of the housing 3.

In a state where the dust cap 5 is placed in the housing 3, the locked portion 21 is locked to the locking portion 19, and the dust cap 5 is integrally placed in the housing 3 inside the housing 3. In this state, the releasing operation portion 23 projects from the housing 3. That is, the releasing operation portion 23 is provided on a portion of the dust cap body portion 15 which projects from the housing 3.

In a state where the dust cap 5 is placed in the housing 3, a portion of the dust cap body portion 15 (portion from the closing portion 17 to the intermediate portion) is in internally contact with the housing 3. That is, the dust cap 5 engages with the housing 3 in an extremely slight clearance fitting state.

When the releasing operation portion 23 is pressed down in a state where the dust cap 5 is placed in the housing 3, the releasing operation portion 23 and the locked portion 21 are resiliently bent downward, and the locked state between the locked portion 21 of the dust cap 5 and the locking portion 19 of the housing 3 is released. According to this, the dust cap 5 can be detached from the housing 3 by moving the dust cap 5 forward.

A configuration of the connector engagement body 1 will further be described. As shown in FIG. 2, an FOT placing portion 25, a lens placing portion 27 and a dust cap placing portion 29 are provided in the housing 3. The FOT placing portion 25, the lens placing portion 27 and the dust cap placing portion 29 are arranged from a rear side to a front side in this order.

The FOT 7 is accommodated in the FOT placing portion 25. A lens (lens unit) 13 for enhancing optical characteristics is accommodated in the lens placing portion 27. A rear side portion of the dust cap 5 is accommodated in the dust cap placing portion 29.

As shown in FIG. 6, the locking portion 19 slightly projects downward from an upper side inner wall of the dust cap placing portion 29 and is formed into a convex shape. Each of the support portions 11 is, for example, formed from a disk like convex portion, and slightly projects downward from a lower side outer wall of the housing 3. The support portions 11 are located substantially at a central portion of the housing 3 with respect to the front-rear direction. The two convex portions of the support portions 11 are arranged side by side in the width direction of the housing 3.

In a state where the dust cap 5 is placed in the housing 3, a space inside the box-shaped dust cap 5 forms a dust accommodating portion 31. The locked portion 21 and the releasing operation portion 23 are formed in portions of the dust cap body portion 15. That is, a pair of thin and long notches 33 are formed in upper front side wall of the dust cap body portion 15. An arm portion 35 extending in the front-rear direction is formed between the notches 33. The arm portion 35 is flexible. The releasing operation portion 23 is formed on a tip end portion (front end portion) of the arm portion 35. The locked portion 21 is formed on an upper side of an intermediate portion of an arm portion 35.

Figure 4:
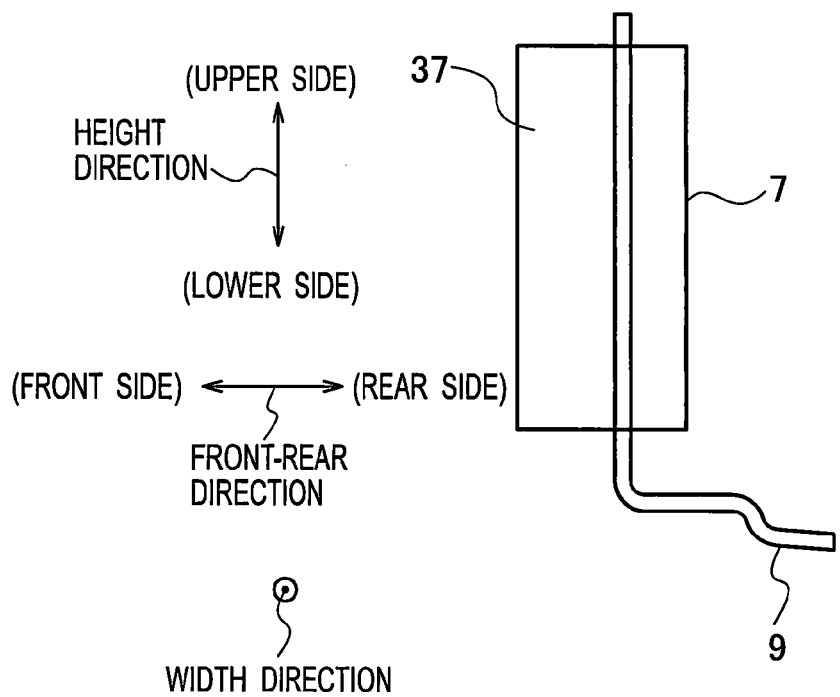
FIG. 4 is a side view of an Fiber Optic Transceiver (FOT) placed in the housing of the connector engagement body according to the embodiment of the invention viewing from a lateral direction (width direction)

As shown in FIG. 4, the FOT 7 includes an FOT body (package) 37. A light emitting element and a light receiving element are provided in the FOT body 37. The lead frame 9 projects from the FOT body portion 37.

As shown in FIG. 7, in the printed board 2, a connector engagement body placing portion 41 where the connector engagement body 1 is placed, the soldering paste 43 through which the lead frame 9 is soldered, and a shield case locking portion 45 to which a shield case 47 for dealing with EMC is locked are provided on predetermined portions of an upper surface of a flat plate-shaped board body 39.

When the housing 3 in which the FOT 7, the lens 13 and the dust cap 5 are placed (connector engagement body 1) is placed on the printed board 2, when the support portions 11 of the housing 3 are placed such that the support portions 11 engage with the printed board 2, rotation moment is generated in the housing 3 around the support portions 11 due to a force of gravity. By this rotation moment, the lead frame 9 biases the soldering paste 43 of the printed board 2.

Next, a placing operation of the connector engagement body 1 onto the printed board 2 will be described.

The connector engagement body placing portion 41 and the like exist on an upper surface of the printed board 2. First, the housing 3 in which the FOT 7, the lens 13 and the dust cap 5 are placed is placed on the printed board 2 while bringing the support portions 11 into contact with the printed board 2. At this time, the support portions 11 are fixed to the printed board 2 by adhesive or a double-face tape for example, and the lead frame 9 comes into contact with the soldering paste 43.

Then, the lead frame 9 is reflow soldered to the soldering paste 43.

Next, the shield case 47 is placed on the printed board 2, the connector engagement body 1 is covered with the shield case 47, and the releasing operation portion 23 of the dust cap 5 is operated to detach the dust cap 5 from the housing 3.

A connector connecting body (not shown) provided on one end of the optical fiber is placed in the housing 3 instead of the dust cap 5.

According to the connector engagement body 1, the entire gravity center exists rearward (on the side of the lead frame 9) of the support portions 11 in a state where the dust cap 5 is placed on a housing 3. Therefore, when the connector engagement body 1 is placed on the printed board 2, moment centering on the support portions 11 is generated, and the lead frame 9 is biased toward the printed board 2. Hence, it becomes easy to solder the printed board 2 of the lead frame 9 to the circuit, and it is possible to stably place the lead frame 9 on the printed board 2.

Since the dust cap 5 has heat resistance, it is possible to stably solder the lead frame 9 to the printed board 2 without detaching the dust cap 5. Hence, when the soldering operation is carried out, mote and dust are prevented from entering the housing 3, and operability of the placing operation of the connector engagement body 1 on the printed board 2 is enhanced.

According to the connector engagement body 1, the dust cap 5 enters the housing 3 in a state where the dust cap 5 is placed in the housing 3, the dust cap 5 does not hinder the placing operation for placing the connector engagement body 1 on the printed board 2, and operability of the placing operation of the connector engagement body 1 on the printed board 2 is enhanced.

According to the connector engagement body 1, when the dust cap 5 is detached from the state where the dust cap 5 is placed in the housing 3, the releasing operation portion 23 is pressed down. Hence, a force in a direction separating from the printed board 2 (force moving upward) is not applied to the support portions 11, a force pressing the printed board 2 is applied to the support portions 11, and it is possible to detach the dust cap 5 in a stable state.

What is claimed is:

1. A dust cap placed in a housing for preventing foreign substance from entering an inner portion of the housing, in which a lead frame of an electronic component projects from the housing, wherein
the dust cap has heat resistance against heat generated when the lead frame is soldered, and
a gravity center including the housing and the electronic component is located closer to the lead frame than a support portion of the housing in a state where the dust cap is placed in the housing,
wherein the support portion projects downward from the bottom surface of the housing.

2. The dust cap according to claim 1, wherein
the housing is formed into a cylindrical shape,
the electronic component is provided in the inner portion of the housing on one end portion of the housing in an extending direction of the housing,
the lead frame projects downward of the housing at one end portion of the housing in an extending direction of the housing,
the support portion projects downward of the housing at an intermediate portion of the housing in an extending direction of the housing,
the dust cap includes a cylindrical dust cap body portion and a closing portion which closes an opening portion in one end of the dust cap body portion in an extending direction of the dust cap body portion,
the dust cap is formed into a box shape,
the housing is provided with a locking portion,
the dust cap is provided with a locked portion and a releasing operation portion,
in a state where the dust cap is placed in the housing, the closing portion is located on a side of the electronic component, the other end portion of the dust cap body portion in an extending direction of the dust cap body portion slightly projects from the other end portion of the housing in an extending direction of the housing, the locked portion is locked to the locking portion, the dust cap is placed in the housing inside the housing, the releasing operation portion projects from the housing, and
in a state where the dust cap is placed in the housing, when the releasing operation portion is pressed down, a locked state between the locked portion of the dust cap and the locking portion of the housing is released, and the dust cap can be detached from the housing.

3. A connector engagement body comprising:
a housing from which a lead frame of a placed electronic component projects; and
a dust cap which has a heat resistance against heat generated when the lead frame is soldered and which is placed in the housing for preventing foreign substance from entering an inner portion the housing, wherein
in a state where the dust cap is placed in the housing, a gravity center including the housing and the electronic component is located closer to the lead frame than a support portion of the housing,
wherein the support portion projects downward from the bottom surface of the housing.

4. The connector engagement body according to claim 3, wherein
the housing is formed into a cylindrical shape,
the electronic component is provided in the inner portion of the housing on one end portion of the housing in an extending direction of the housing,
the lead frame projects downward of the housing at one end portion of the housing in an extending direction of the housing,
the support portion projects downward of the housing at an intermediate portion of the housing in an extending direction of the housing,
the dust cap includes a cylindrical dust cap body portion and a closing portion which closes an opening portion in one end of the dust cap body portion in an extending direction of the dust cap body portion,
the dust cap is formed into a box shape,
the housing is provided with a locking portion,
the dust cap is provided with a locked portion and a releasing operation portion,
in a state where the dust cap is placed in the housing, the closing portion is located on a side of the electronic component, the other end portion of the dust cap body portion in an extending direction of the dust cap body portion slightly projects from the other end portion of the housing in an extending direction of the housing, the locked portion is locked to the locking portion, the dust cap is integrally placed in the housing inside the housing, the releasing operation portion projects from the housing, and
in a state where the dust cap is placed in the housing, when the releasing operation portion is pressed down, a locked state between the locked portion of the dust cap and the locking portion of the housing is released, and the dust cap can be detached from the housing.

5. The dust cap according to claim 1, wherein the housing and the dust cap comprise an integrally formed insulating material.

6. The dust cap according to claim 1, wherein the electronic component comprises a Fiber Optic Transceiver (FOT).

7. The dust cap according to claim 1, wherein the lead frame is soldered by reflow soldering.

8. The dust cap according to claim 1, wherein the lead frame is soldered by soldering paste, which is previously applied to predetermined portions of a printed board body.

9. The dust cap according to claim 1, wherein the support portions are provided at an intermediate portion of the housing with respect to the front-rear direction of the housing.

10. The dust cap according to claim 1, wherein
the support portions project slightly toward a lower side from a lower end of the housing with respect to a height direction of the housing,
the housing from which the support portions project toward the lower side is placed on a printed board,
a lower end portion of the support portions engage with the printed board, and
the printed board projects in the horizontal direction in a state where a thickness direction of the printed board corresponds to the height direction of the housing.

11. The dust cap according to claim 1, wherein
the electronic component comprises a Fiber Optic Transceiver (FOT); and
the housing and the FOT have heat resistances against heat generated when the lead frame is soldered.

12. The dust cap according to claim 1, wherein in a state where a placing operation of the housing provided with the FOT on a printed board is completed,
 the support portions and the lead frame engage with the printed board, and
 other portions of the housing and the dust cap placed on the housing are separated from the printed board in an upward direction.

13. The dust cap according to claim 1, wherein in a state where the electronic component and the dust cap are placed in the housing and the housing is soldered, the gravity center of a total mass of the housing, the electronic component and the dust cap is located rearward of the support portions.

14. The dust cap according to claim 1, wherein, the gravity center is located between the support portions and the lead frame with respect to the front-rear direction of the housing.

15. The dust cap according to claim 1, wherein the housing is formed into a rectangular cylindrical shape.

16. The dust cap according to claim 1, wherein the electronic component comprises a Fiber Optic Transceiver (FOT) provided on one end portion of the housing in a front-rear direction.

17. The dust cap according to claim 16, wherein the FOT is provided on a rear end portion in the housing in which a center axis extends in the front-rear direction.

18. The connector engagement body according to claim 3, wherein
 the electronic component comprises a Fiber Optic Transceiver (FOT),
 the housing further comprises an FOT placing portion, a lens placing portion and a dust cap placing portion.

19. The connector engagement body according to claim 18, wherein the FOT placing portion, the lens placing portion and the dust cap placing portion are arranged in order from a rear side to a front side.

20. The connector engagement body according to claim 18, wherein
 the FOT is accommodated in the FOT placing portion,
 a lens unit that enhances optical characteristics is accommodated in the lens placing portion, and
 a rear side portion of the dust cap is accommodated in the dust cap placing portion.

* * * * *